United States Patent
Park

[11] Patent Number: 6,055,356
[45] Date of Patent: Apr. 25, 2000

[54] TRACKING CONTROL METHOD AND APPARATUS FOR VIDEO RECORDER/PLAYER

[75] Inventor: Il-Joo Park, Suwon, Rep. of Korea

[73] Assignee: Samsung Electronics Co., Ltd., Kyungki-do, Rep. of Korea

[21] Appl. No.: 08/877,551

[22] Filed: Jun. 17, 1997

[30] Foreign Application Priority Data

Jun. 24, 1996 [KR] Rep. of Korea ............ 96-23170

[51] Int. Cl.[7] ............................. H04N 5/95
[52] U.S. Cl. ............... 386/87; 386/80; 386/78
[58] Field of Search ................. 386/7, 9, 68, 78, 386/79, 80, 81, 93, 96; 360/73.01, 73.05, 73.06, 73.07, 73.08, 73.09

[56] References Cited

U.S. PATENT DOCUMENTS

| | | | |
|---|---|---|---|
| 4,613,914 | 9/1986 | Kobori et al. | 386/78 |
| 5,684,916 | 11/1997 | Hong | 386/78 |
| 5,892,884 | 4/1999 | Sugiyama et al. | 386/96 |

*Primary Examiner*—Thai Tran
*Assistant Examiner*—Christopher Onuaku
*Attorney, Agent, or Firm*—Sughrue, Mion, Zinn, Macpeak & Seas, PLLC

[57] ABSTRACT

A tracking control method and apparatus is provided for producing an optimum picture without noise during a slow reproducing mode of a video recorder/player, such as still mode. According tot the method and apparatus, an envelope of a composite video signal picked up from the five heads is sampled at a sampling period corresponding to head switching pulses when the recorder player is changed over to the slow reproducing mode, then analysis is performed to determine whether the sampled composite envelope has maximum uniformity. If the amplitude uniformity of the sampled composite envelope is not already maximum, the tracking value for use by the servo and capstan motor is automatically controlled so that the amplitude uniformity of the sampled signal becomes a maximum.

6 Claims, 3 Drawing Sheets

TRACKING CONTROL METHOD AND APPARATUS FOR VIDEO RECORDER/PLAYER

BACKGROUND OF THE INVENTION

1. Field of the Invention

The present invention relates to the tracking control of a video recorder/player. In particular, the present invention relates to a tracking control method and apparatus for a video recorder/player capable of reproducing a video signal with an optimum picture quality by varying a tracking value so that the amplitude uniformity of a signal obtained by sampling the envelope of a reproduced video signal reaches its maximum value especially when data recorded in a recording medium is reproduced in a slow reproducing mode, for example, in a still mode.

This method and apparatus for tracking control in a video recorder/player is based on Korean Patent Application No. 96-23170 which is incorporated by reference herein for all purposes.

2. Description of the Related Art

FIG. 1 is a block diagram of a conventional video recorder/player. Referring to FIG. 1, the conventional video recorder/player includes a signal processing section 2 for separating a signal reproduced by a video head section 1 into a video signal and an audio signal and providing the video and audio signals to a reproducing section 3. A system controller 5 controls the operation of the whole system in accordance with the video signal provided from the signal processing section 2 and data inputted through a data input section 4. A servo section 6 provides head switching pulses and control pulses to the system controller 5 and controls the operation of a capstan motor 7 in accordance with a control signal outputted from the system controller 5.

During the operation of the conventional video recorder/player as constructed above, if data corresponding to change-over of the recorder/player to a slow reproducing mode is inputted through the data input section 4, the system controller 5 scans the data and outputs control signals to the subsystems under its control so as to operate them in the slow reproducing mode.

If a viewer judges that the picture displayed on a cathode ray tube (CRT) contains noise when the recorder/player has been changed over to the slow reproducing mode, he or she must perform a tracking control to achieve an optimum picture. This causes inconvenience in use.

SUMMARY OF THE INVENTION

It is an object of the present invention to solve the problems involved in the related art, and to provide a tracking control method and apparatus for a video recorder/player whereby an optimum picture can be provided. This is accomplished by varying the tracking value so that the amplitude uniformity of a signal obtained by sampling the envelope of a reproduced video signal reaches its maximum value in a slow reproducing mode.

In order to achieve the above object, a tracking control method for a video recorder/player is provided which comprises the steps of:

(a) changing over a system to a slow reproducing mode if data inputted through a data input section for determining operation modes of the system corresponds to the slow reproducing mode;

(b) executing a tracking finding in the slow reproducing mode and determining whether or not a current picture state is optimum;

(c) determining whether or not a capstan motor is at a standstill if it is determined that the current picture state is not optimum;

(d) sampling a picked-up video signal by a predetermined sampling number per frame if it is determined that the capstan motor is at a standstill;

(e) determining whether or not an amplitude uniformity of a sampled signal is maximum; and (f) outputting a capstan motor control signal to a servo section in response to a tracking value provided when the amplitude uniformity of the sampled signal is maximum as a result of amplitude uniformity determination to terminate the tracking finding.

BRIEF DESCRIPTION OF THE DRAWINGS

The above object, other features, and advantages of the present invention will become more apparent by describing the preferred embodiment thereof with reference to the accompanying drawings, in which.

DETAILED DESCRIPTION OF PREFERRED EMBODIMENT

Figure 1:
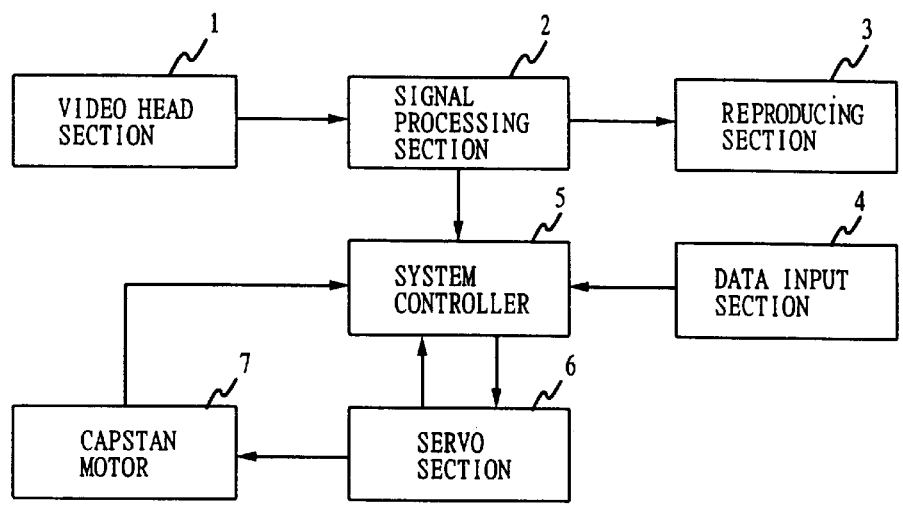
FIG. 1 is a block diagram of a conventional video recorder/player.
Figure 2:
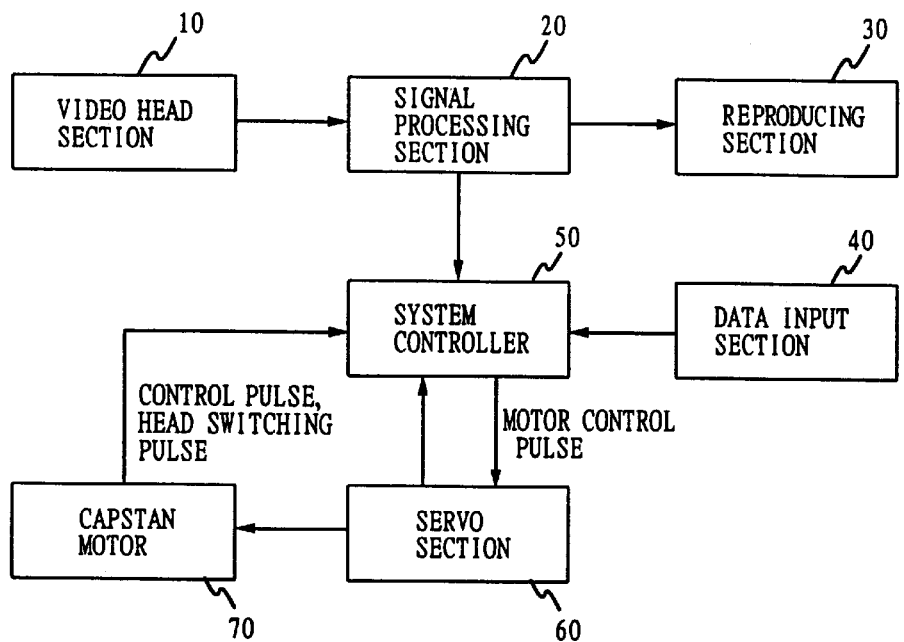
FIG. 2 is a block diagram of a video recorder/player incorporating the tracking control apparatus according to the present invention.

FIG. 2 shows the construction of the video recorder/player according to the present invention. Referring to FIG. 2, a signal processing section 20 separates a composite video signal, which is picked up and outputted from a video head section 10, into a video signal and an audio signal and provides the video and audio signals to a reproducing section 30.

A system controller 50 samples an envelope of the composite video signal outputted from the signal processing section 20 based on head switching pulses. The controller 50 then determines whether the amplitude uniformity of the sampled signal is maximum, and varies the tracking value in accordance with the determined amplitude uniformity to output a corresponding capstan motor control signal.

The system controller 50 also scans data inputted through a data input section 40 and outputs control signals for controlling its peripheral systems (such as servo section 60) in accordance with the inputted data.

Servo section 60 controls the speed of a capstan motor 70 in response to the capstan motor control signal outputted from the system controller 50.

The automatic tracking control process of the video recorder/player according to the present invention will be explained in detail with reference to FIGS. 3 and 4.

Figure 3:
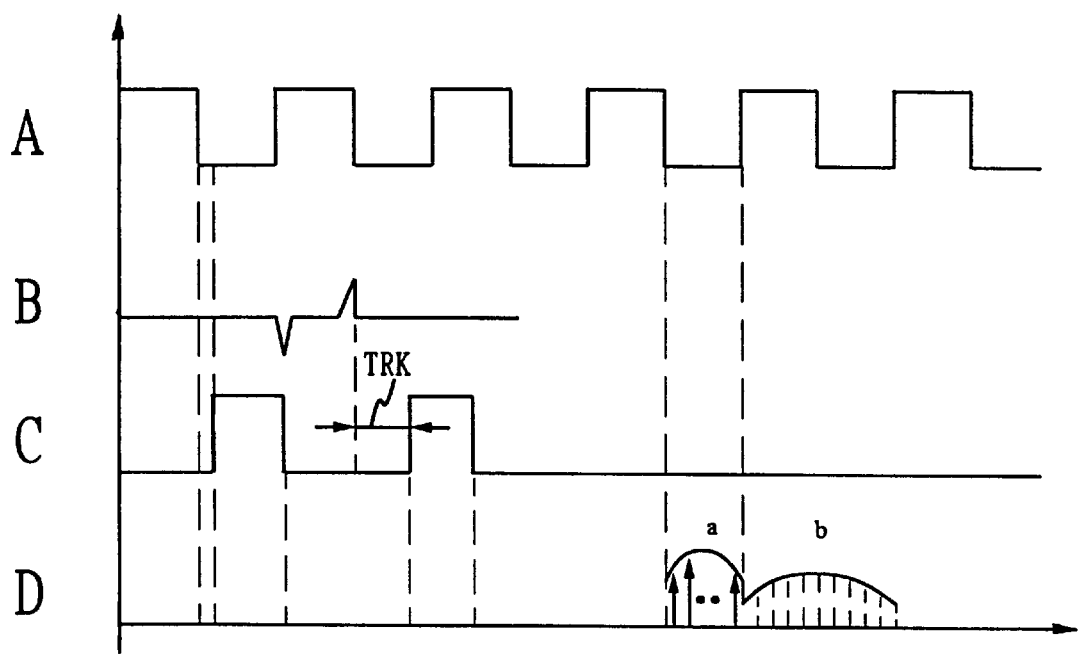
FIG. 3 is a waveform timing diagram showing operational waveforms A through D at various points of the video recorder/player circuit of FIG. 2.
Figure 4:
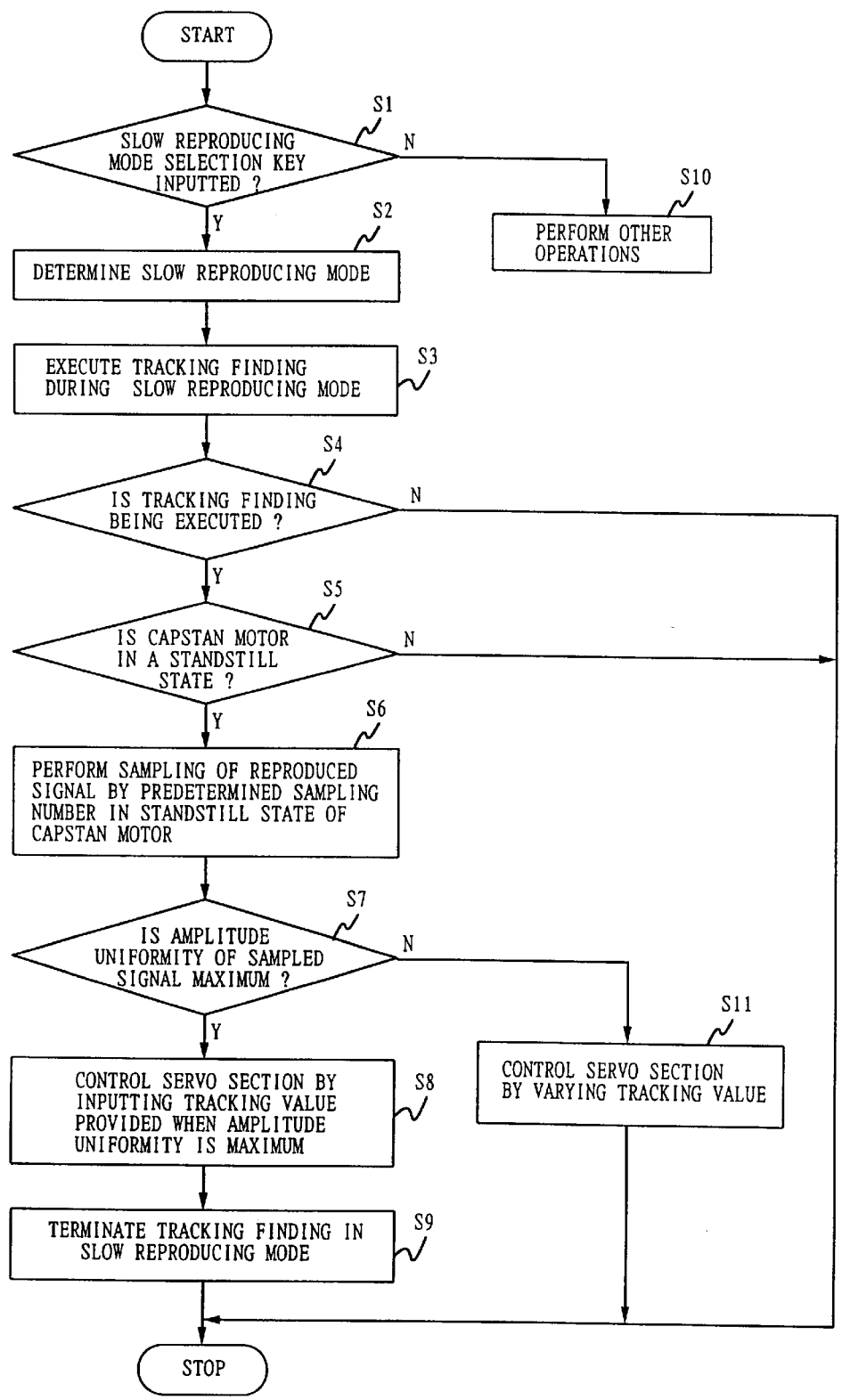
FIG. 4 is a flowchart showing an algorithm incorporating the tracking control method for a video recorder/player according to the present invention.

If data corresponding to a slow reproducing mode, for example, a still mode, is inputted through the data input section 40 of the video recorder/player incorporating the tracking control apparatus according to the present invention, the system controller 50 controls the output of the motor control pulse as shown in waveform C of FIG. 3, based on the head switching pulses and control pulses as shown in waveforms A and B, respectively, and simultaneously performs the slow reproducing mode utilizing the tracking time which is variable in the range of 0 ms to 33 ms in the NTSC system (or in the range of 0 ms to 30 ms in the PAL system). Specifically, the system controller 50 drives the stationary capstan motor 70 as synchronizing it with the head switching pulses. Upon performing the slow reproducing mode, the system controller 50 stops the capstan motor 70 using the motor control pulses again after a delay time TRK corresponding to the tracking value based on the control pulses. By repeating the above described operation, the system controller 50 performs the slow reproducing mode.

When the video recorder/player is changed over to the slow reproducing mode, the system controller 50 performs a sampling operation within time intervals a and b of the video signal provided from the signal processing section 20 as shown in waveform D of FIG. 3, and then determines whether the amplitude uniformity of the sampled signal is maximum. When the amplitude uniformity is determined to be less than maximum, the system controller 50 issues a control command to the servo section 60 to control the capstan motor 70 by varying the tracking value to correspond to a previously determined maximum uniformity tracking value.

On the other hand, if the amplitude uniformity is determined to be at a maximum value, the servo section 60 is controlled to use the tracking value which yields the maximum amplitude uniformity of the sampled signal. This results in an optimum picture being displayed on the screen.

Now, the automatic tracking value varying method will be explained in detail with reference to FIG. 4.

When the data corresponding to the slow reproducing mode is inputted through the data input section 40, the data is detected by the system controller 50 when it scans the input data. The system controller 50 then determines whether the current mode is the slow reproducing mode (step S1). If is the current data mode reflects the slow reproducing mode, the system controller 50 determines the slow reproducing mode (step S2) to be the current mode, and performs a tracking finding during the slow reproducing mode (step S3). If the current mode data is not the slow reproducing mode, the system controller 50 performs other operations according to the inputted mode (step S10).

Upon performing a tracking finding (step S3), the system controller 50 determines if the tracking finding is being executed (step S4), and if so, the system controller 50 determines whether or not the capstan motor 70 is in a standstill state (step S5).

If it is determined that the capstan motor 70 is in the standstill state, the system controller 50 samples the video signal outputted from the signal processing section 20 (step S6), and then determines whether or not the amplitude uniformity of the sampled signal is maximum (step S7).

If it is determined that the amplitude uniformity is maximum, the system controller 50 controls the servo section 60 by the tracking value provided at this time and terminates the tracking finding (steps S8 and S9). However, if the amplitude uniformity is not maximum, the system controller 50 controls the servo section 60 by varying the tracking value (step S11) to a value known to provide maximum amplitude uniformity.

As described above, according to the present invention, since the envelope of the picked-up video signal is sampled and the tracking value is automatically adjusted so that the amplitude uniformity of the sampled signal becomes maximum, an optimum picture without noise can be displayed.

Although an illustrative embodiment of the present invention has been specifically described above with reference to the accompanying drawings, it is to be understood, that the invention is not limited to that precise embodiment, and that various changes and modifications may be effected therein by one skilled in the art without departing from the scope or spirit of the invention as defined in the appended claims.

What is claimed is:

1. A tracking control method for use in a video recorder/player having a servo section for controlling a capstan motor, and a data input section for determining operation modes of the video recorder/player, the tracking control method comprising the steps of:

(a) changing the video recorder/player to a slow reproducing mode if data inputted through the data input section corresponds to said slow reproducing mode;

(b) performing a tracking finding in said slow reproducing mode and determining whether or not a current picture state is optimum;

(c) determining whether or not the capstan motor is at a standstill if it is determined that said current picture state is not optimum;

(d) sampling, if it is determined that the capstan motor is at a standstill, a video signal picked-up by the video recorder/player at a predetermined rate of samples per frame to produce sampled signals;

(e) determining whether or not said sampled signals have a maximum amplitude uniformity; and (f) outputting a capstan motor control signal to the servo section so that the capstan motor will operate consistent with a tracking value for producing maximum amplitude uniformity of said sampled signals.

2. A tracking control apparatus for a video recorder/player having video heads for picking up video signals and a capstan motor, the tracking control apparatus comprising:

signal processing means for separating a composite video signal picked up from the video head into a video signal and an audio signal, and providing said video and audio signals to a reproducing means;

a system controller for sampling at sampling intervals an envelope of said composite video signal, outputted from said signal processing means, said system controller determining whether sampled values of the envelope have a maximum amplitude uniformity, said system controller varying a tracking value in accordance with maximum uniformity of said sampled values to output a corresponding capstan motor control signal; and servo means for controlling a speed of the capstan motor in response to said capstan motor control signal outputted from said system controller.

3. The tracking control apparatus as claimed in claim 2, wherein said sampling intervals for sampling said envelope is a period between head switching pulses.

4. A tracking control apparatus for a video recorder/player having video heads for picking up video signals and a capstan motor, the tracking control apparatus comprising:

a signal processing section which receives a composite video signal picked up from the video head and provides an envelope of said composite video signal as an output;

a system controller which receives said envelope of said composite video signal, stops said capstan motor, and samples said envelope at sampling intervals, and which provides a capstan motor control signal as an output so as to provide an optimum tracking value such that sampled values of said envelope have a maximum amplitude uniformity; and servo controller receiving said capstan motor control signal from said system controller and providing control of the capstan motor in accordance with said optimum tracking value.

5. The tracking control apparatus as claimed in claim 4, wherein said sampling intervals for sampling said envelope is a period between head switching pulses.

6. A tracking control apparatus for a video recorder/player having video heads for picking up video signals and a capstan motor, the tracking control apparatus comprising:

signal processing means for separating a composite video signal picked up from the video head into a video signal and an audio signal, and providing said video and audio signals to a reproducing means;

a system controller for stopping said capstan motor and sampling at intervals an envelope of said composite video signal, outputted from said signal processing means, said system controller determining whether sampled values of the envelope have a maximum amplitude uniformity, said system controller varying a tracking value in accordance with maximum uniformity of said sampled values to output a corresponding capstan motor control signal; and servo means for controlling a speed of the capstan motor in response to said capstan motor control signal outputted from said system controller.

* * * * *